US008708797B2

(12) United States Patent
Gauselmann

(10) Patent No.: US 8,708,797 B2
(45) Date of Patent: Apr. 29, 2014

(54) DEVICE TO AUTOMATICALLY CHANGE AWARD PARAMETERS FOR A GAMING MACHINE

(75) Inventor: Michael Gauselmann, Espelkamp (DE)

(73) Assignee: Spielo International Canada ULC, Moncton, New Brunswick (CA)

( * ) Notice: Subject to any disclaimer, the term of this patent is extended or adjusted under 35 U.S.C. 154(b) by 353 days.

(21) Appl. No.: 12/855,353

(22) Filed: Aug. 12, 2010

(65) Prior Publication Data

US 2011/0014968 A1 Jan. 20, 2011

Related U.S. Application Data

(62) Division of application No. 10/277,525, filed on Oct. 21, 2002, now Pat. No. 7,841,935.

(30) Foreign Application Priority Data

Nov. 14, 2001 (DE) .................................. 101 55 944

(51) Int. Cl.
*A63F 13/00* (2014.01)

(52) U.S. Cl.
USPC ............................................... 463/20; 463/21

(58) Field of Classification Search
USPC .......................................... 463/20, 21, 23, 25
See application file for complete search history.

(56) References Cited

U.S. PATENT DOCUMENTS

| | | | | |
|---|---|---|---|---|
| 5,697,843 | A * | 12/1997 | Manship et al. | 463/20 |
| 5,910,048 | A | 6/1999 | Feinberg | |
| 6,098,977 | A | 8/2000 | Sato et al. | |
| 6,155,925 | A * | 12/2000 | Giobbi et al. | 463/20 |
| 6,217,448 | B1 | 4/2001 | Olsen | |
| 6,231,445 | B1 | 5/2001 | Acres | |
| 6,234,897 | B1 * | 5/2001 | Frohm et al. | 463/20 |
| 6,254,483 | B1 | 7/2001 | Acres | |
| 6,319,125 | B1 | 11/2001 | Acres | |
| 6,398,218 | B1 | 6/2002 | Vancura | |
| 6,656,048 | B2 | 12/2003 | Olsen | |
| 6,663,489 | B2 | 12/2003 | Baerlocher | |
| 6,939,230 | B2 | 9/2005 | Vancura | |
| 7,048,628 | B2 | 5/2006 | Schneider | |
| 7,070,501 | B2 | 7/2006 | Cormack et al. | |
| 2001/0036857 | A1 | 11/2001 | Mothwurf et al. | |
| 2002/0094856 | A1 | 7/2002 | Bennett et al. | |
| 2003/0078088 | A1 | 4/2003 | Schneider | |

* cited by examiner

*Primary Examiner* — Arthur O Hall
*Assistant Examiner* — Allen Chan
(74) *Attorney, Agent, or Firm* — Patent Law Group LLP; Brian D Ogonowsky

(57) ABSTRACT

A control unit in communication with a plurality of gaming machines selects one or more of the active machines to be set to an enhanced play mode. The selection may be random or based on other factors. During the enhanced play mode, the awards attributed to each symbol combination are increased, and the game parameters, other than the award amounts may be changed.

1 Claim, 2 Drawing Sheets

DEVICE TO AUTOMATICALLY CHANGE AWARD PARAMETERS FOR A GAMING MACHINE

CROSS-REFERENCE TO RELATED APPLICATIONS

This application is a division of U.S. application Ser. No. 10/277,525, filed on Oct. 21, 2002, entitled "Device to Automatically Change Award Parameters for a Gaming Machine," incorporated herein by reference.

FIELD OF INVENTION

The invention is related to gaming devices and, in particular, to changing the achievable awards granted by a gaming machine.

BACKGROUND

From the U.S. Pat. No. 6,217,448 B1, a system of linked gaming machines is known that is connected to an external controller and an overhead display. In a special bonus mode time period, the controller randomly determines one or more of the active gaming machines for bonus multiplier opportunities, where an award normally granted by a gaming machine is multiplied by a bonus multiplier. Upon a selected gaming machine obtaining a winning symbol combination, the gaming machine's internal control unit pays out the normal award, and the controller then causes the internal control unit to pay out the multiplied award. The increased payouts are deducted from a bonus pool.

SUMMARY

The gaming device of the present invention increases the attraction for a player by providing an additional feature. The device of the present invention has the advantage that at an unpredicted point in time, which cannot be anticipated by the player, the gaming machine is set to an enhanced play mode. During the enhanced play mode, the awards attributed to each symbol combination are increased. The enhanced play mode may exist for a predetermined number of games, a selectable period of time, or until an award level is reached. In a further embodiment of the present invention, the enhanced play mode grants free games for a predetermined number of games, a selectable period of time, or until an award level is reached. The enhanced awards need not be provided from any special bonus pool.

During the enhanced play mode, the game itself may change, such as by displaying a different set of symbols, adding new winning combinations, changing the pay loading, or changing the win frequency. By changing the pay loading or win frequency, the machines are operated economically despite the enhanced play mode.

In one embodiment, to ensure that the gaming machine can be operated economically in spite of the enhanced play mode, each gaming machine transmits a signal to an external control unit to show its readiness to participate in the enhanced play mode only if certain parameters are met.

BRIEF DESCRIPTION OF THE DRAWINGS

The present invention is described with reference to the following drawings.

DETAILED DESCRIPTION

Figure 1:
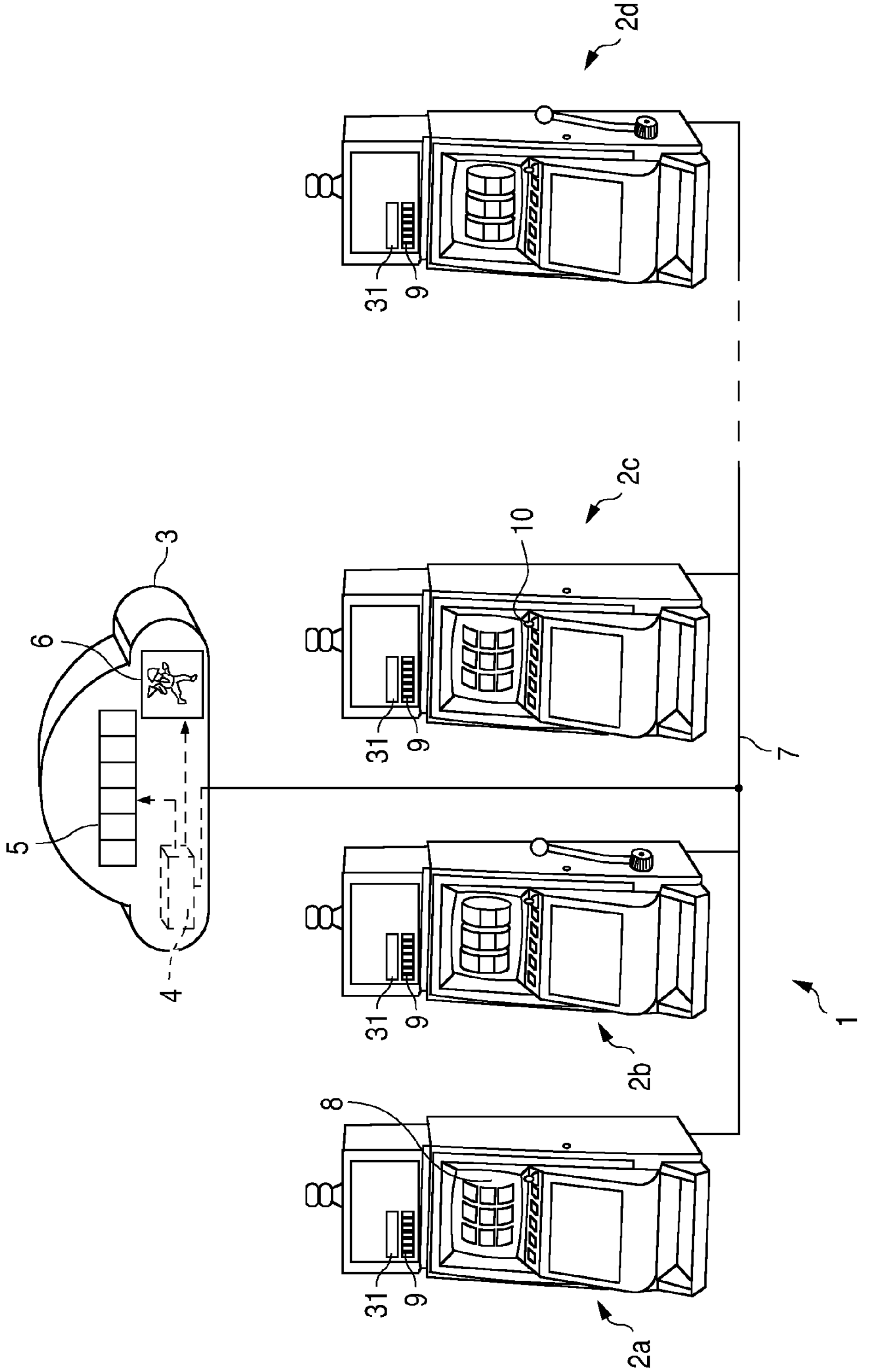
FIG. 1 is a perspective view of a system of gaming machines, a control unit, and a jackpot display.

A system of gaming machines 1 illustrated in FIG. 1 comprises one or more gaming machines 2*a*-2*d* and a jackpot display enclosure 3 housing a separate control unit 4 to control the enhanced play mode, a jackpot display 5 to display a jackpot amount, and an enhanced play mode display 6 to indicate the activation of the enhanced play mode. The gaming machines 2*a*-2*d* are linked within a communication network by wires 7 or by a wireless connection. The gaming machines 2*a*-2*d* within the network can feature different games.

Each gaming machine 2*a*-2*d* comprises its own display 8 to display, for example, pseudo-randomly generated winning or non-winning symbol combinations across one or more pay lines. The display 8 may be a video screen (e.g., a CRT or TFT display) or mechanical reels. A jackpot amount is displayed on the display 5 and on a display 9 of each gaming machine 2*a*-2*d*.

On the front of each gaming machine 2*a*-2*d*, there is a money acceptor 10 (such as for bills, coins, or cards) adjacent to the display 8. The money acceptor 10 is connected to a control unit, comprising a microprocessor, within the gaming machine 2*a*-2*d*.

The control unit 4 in the jackpot display enclosure 3 controls the jackpot display 5 and the enhanced play mode display 6, as well as controlling other aspects of the enhanced play mode. The jackpot display 5 can be a dot-matrix-display, an LCD, a CRT, or any other type of display. The display 6 can be a translucent illuminated display, a CRT, a TFT display, an LCD, or any other type of display. The control unit 4, comprising a microprocessor, in the jackpot display enclosure 3 is connected to the communications network via wires or a wireless (RF or infrared) connection. The control unit 4 may increment the jackpot display 5 based on a percentage of bets or based on any other factors. A jackpot symbol combination by one of the gaming machines 2*a*-2*d* wins all or a portion of the displayed jackpot, and the displayed jackpot amount is decremented.

Figure 2:
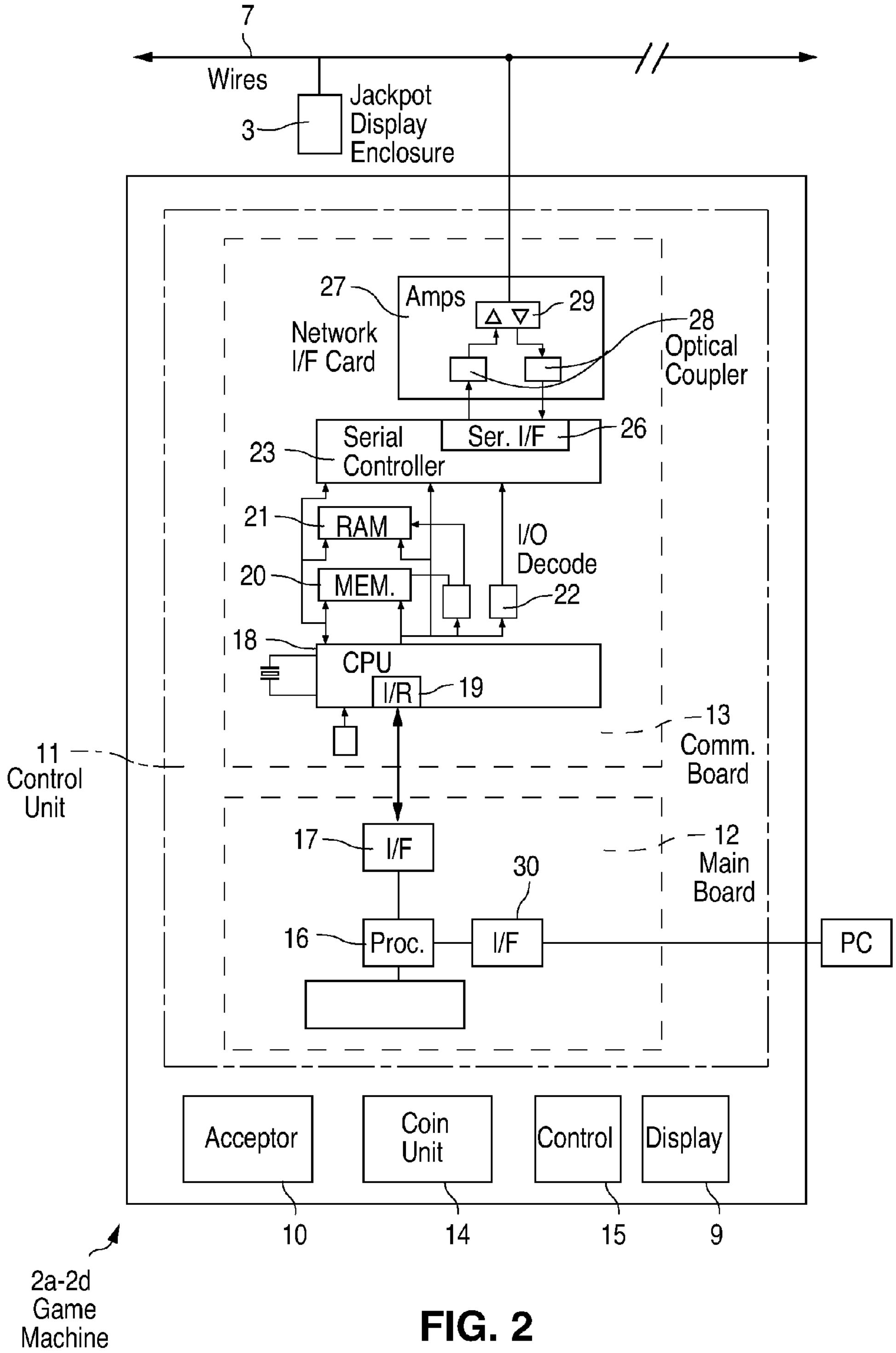
FIG. 2 illustrates the main parts of a gaming machine, including a communication circuit to communicate with the external control unit.

The block diagram of FIG. 2 illustrates functional units used to operate a gaming machine 2*a*-2*d* within the network. The gaming machine 2*a*-2*d* includes a control unit 11. The control unit 11 comprises a main board 12 and a communications board 13. The communications board 13 controls the control unit 4 in the jackpot display enclosure 3 and the data transfer through the network.

A money acceptor 10 forms part of a coin unit 14, such as described in German application DE 364 13 46 A1. The coin unit 14 comprises an electronic coin validator, a hopper and a coin tray. Player control elements 15 are connected to a microcomputer 16 of the main board 12. The microcomputer 16 of the main board 12 comprises a microprocessor with a logic unit, an accumulator battery, a memory, a pulse generator, serial interfaces 17, a BUS system, and an input/output device to control the data transfer with peripheral devices such as the control unit 4, coin unit 14, and control elements 15. The BUS system provides all elements with data and storage addresses and control signals. The serial interface 17 (TTL) establishes a connection with the communications board 13. The serial interface 17 can be RS232 or any other kind of interface.

The communications board 13 comprises a CPU 18 with a serial interface 19. The CPU 18 comprises non-volatile memory 20 and RAM 21. CPU 18, the memory 20, 21, and a serial controller 23 with a serial interface 26 communicate via respective addresses, an I/O-decoder 22, and a BUS system using conventional techniques.

A network interface card 27 is connected to the serial interface 26 (e.g., RS485) of the controller 23. The network interface card 27 comprises an optical coupler 28 for galvanic isolation and an amplifier 29, which is connected to the network via wires 7.

The communication boards 13 of all gaming machines 2*a*-2*d* are connected and communicate to each other. Each communications board 13 has a unique address, which can be set manually. After all gaming machines 2*a*-2*d* are powered up, it is decided automatically which gaming machine 2*a*-2*d* is the master or the slave. All slaves communicate with the master, and the master controls the control unit 4 within the jackpot display enclosure 3 and manages the jackpots. There may be multiple jackpots A and B. In case that there is more than one master after power up, the master with the lowest address becomes a slave.

After a successful master and slave determination upon start up of the gaming machines 2*a*-2*d*, the communications board 13 sends an enable signal to the main board 12. The percentage of each bet in the gaming machines 2*a*-2*d* that is paid to jackpot A and/or B can be configured with a personal computer via an interface 30 (e.g., RS232) on the main board 12. The values of the jackpots A and B are displayed on the display 9 in each gaming machine and on the jackpot display 5 in one or more jackpot display enclosures 3.

After credits are put into the gaming machine 2*a*-2*d*, the control unit 11 for the gaming machine sends a signal, via the master, to the external control unit 4 to indicate to the control unit 4 that the gaming machine is being played and is eligible for the enhanced play mode. Each gaming machine 2*a*-2*d* can be operated with a single bet or an increased bet.

The external control unit 4 determines which of the gaming machines 2*a*-2*d* is activated for the enhanced play mode and controls display 6 to convey that the enhanced play mode is activated. The players of the gaming machines 2*a*-2*d* can see on the display 6 in the jackpot display enclosure 3 that one of the gaming machines 2*a*-2*d* is being chosen for being played in the enhanced play mode. Display 6 may display any icon or animation conveying that the enhanced play mode game machine is being randomly selected, such as by a pseudo-random number generator. The control unit 4 then sends an activation signal, via the master, to the control unit 11 of the selected gaming machine.

The start time of the enhanced play mode may be randomly chosen, based on predetermined times, based on whether the ratio of awards granted versus bets have gone below a certain level, based on games played, or based on other factors.

If there is an activation signal for one of the gaming machines 2*a*-2*d*, the control unit 11 activates a display device 31 (e.g., a backlit sign) on the gaming machine informing the player that the gaming machine will be played in the enhanced mode. Multiple gaming machines may also be selected for the enhanced play mode.

In one embodiment, during the enhanced play mode, any award is automatically increased to a predetermined maximum award for the particular symbol combination obtained by the gaming machine. In another embodiment, all awards are multiplied by for example 2, 3, 4, 5, etc. as selected by the control unit 4. In another embodiment, the player of the selected gaming machine can play for free for a predetermined number of games. For awarding free games, the control unit 11 of the gaming machine 2*a*-2*d* that receives the change-mode signal will lock the debiting of the bets for a predetermined number of games or for a predetermined period of time. Within this period the player can play the gaming machine 2*a*-2*d* without any further bet but obtain awards as if a bet were made.

In a further embodiment of the present invention, a gaming machine 2*a*-2*d* sends a registering signal to the external control unit 4 if the amount of the achieved awards for that machine compared with the bets of the preceding games is smaller than a predetermined threshold value. In response to the signal, the control unit 4 determines that the one or more registered gaming machines 2*a*-2*d* are eligible to be set to the enhanced play mode. The selection may be pseudo-random or based on other factors.

The duration of the enhanced play mode can be determined pseudo-randomly by the control unit 4 in the jackpot display enclosure 3, or the duration can be determined by the number of games played or whether the awards granted have reached a certain limit. The control unit 11, as commanded by the control unit 4, controls the various parameters of the game to carry out the enhanced play mode.

In one embodiment, as long as a predetermined economical limit is not reached, the gaming machine 2*a*-2*d* can be played in the enhanced play mode. Upon reaching or exceeding the economical limit of the gaming machine 2*a*-2*d*, the enhanced play mode will be stopped by the control unit 4. In one embodiment, the control unit 4 controls the control unit 11 of the selected gaming machine 2*a*-2*d* to change the win frequency and/or pay loading (average payout) of the subsequent games such that the economical limit will be reached within a predetermined number of games. Changing the parameters of the game itself (as opposed to just the awards) may be performed by controlling the control unit 11 to carry out a different software program stored in memory.

In another embodiment, the enhanced play mode may also change the symbols available to the selected gaming machine for forming winning combinations of symbols to add further excitement. Additional winning symbol combinations may also be added during the enhanced play mode.

The jackpot display 5 need not be controlled by the control unit 4 but may be independently controlled by another processor. Display 5 may be used for other purposes or deleted if no progressive jackpot is provided by the system. The control unit 4 may be internal to the jackpot display enclosure 3 or external to it.

The hardware and software configurations of the gaming machines, network, and components in the jackpot display enclosure can be changed while still providing a network that can adequately carry out the invention.

While particular embodiments of the present invention have been shown and described, it will be obvious to those skilled in the art that changes and modifications may be made without departing from this invention in its broader aspects and, therefore, the appended claims are to encompass within their scope all such changes and modifications as fall within the true spirit and scope of this invention.

What is claimed is:

1. A gaming device for use in combination with a network of gaming machines, the gaming machines randomly displaying combinations of symbols, certain symbol combinations being winning combinations providing an award for a player, the gaming machines providing a first set of awards for respective symbol combinations in a non-enhanced play mode, the device comprising:

a control unit in communication with a plurality of gaming machines, the control unit selecting one or more of the gaming machines for operating in an enhanced play mode for periods of time, wherein the control unit changes the win frequency of awards granted by the combinations of symbols throughout the entire enhanced play mode in the selected one or more gaming machines, the control unit changing the win frequency automatically independent of any player selection during a game, the win frequency in the enhanced play mode being increased for the same winning symbol combinations used during the non-enhanced play mode, wherein the symbols forming all combinations of symbols during the enhanced play mode are the same symbols used in the non-enhanced mode for forming symbol combinations.

* * * * *